United States Patent
Abdulghafoor

(10) Patent No.: US 9,587,781 B1
(45) Date of Patent: Mar. 7, 2017

(54) DEVICE FOR REPAIRING DRAINAGE PIPES

(71) Applicant: Amir J. A. J. Abdulghafoor, Safat (KW)

(72) Inventor: Amir J. A. J. Abdulghafoor, Safat (KW)

( * ) Notice: Subject to any disclaimer, the term of this patent is extended or adjusted under 35 U.S.C. 154(b) by 0 days.

(21) Appl. No.: 15/184,884

(22) Filed: Jun. 16, 2016

(51) Int. Cl.
*F16L 55/16* (2006.01)
*F16L 55/165* (2006.01)

(52) U.S. Cl.
CPC ................................. *F16L 55/1652* (2013.01)

(58) Field of Classification Search
USPC .......................... 138/97, 98; 405/150.1, 184.2
See application file for complete search history.

(56) References Cited

U.S. PATENT DOCUMENTS

| | | | |
|---|---|---|---|
| 2,794,758 A | 6/1957 | Harper et al. | |
| 4,064,211 A | 12/1977 | Wood | |
| 4,445,716 A | 5/1984 | Hoffman | |
| 4,867,921 A | 9/1989 | Steketee, Jr. | |
| 4,950,446 A * | 8/1990 | Kinumoto | B29C 49/26 138/97 |
| 5,609,439 A * | 3/1997 | Schreiner | E03F 3/06 156/156 |
| 5,752,786 A * | 5/1998 | Huikari | F16L 55/1652 138/97 |
| 6,644,356 B1 | 11/2003 | Connor et al. | |
| 6,701,965 B1 * | 3/2004 | Grace | E03C 1/12 138/112 |
| 2015/0338014 A1 | 11/2015 | Bichler | |

FOREIGN PATENT DOCUMENTS

CN 201373210 Y 12/2009

* cited by examiner

*Primary Examiner* — James Hook
(74) *Attorney, Agent, or Firm* — Richard C. Litman

(57) ABSTRACT

A device for repairing drainage pipes includes a flexible tube with a first open end, a second open end, and a hollow interior extending between the first and second ends. A cover member is attached to the first end of the tube and a ball is releasably attached to the second end. The cover member has a central opening that is aligned with the hollow interior. The cover member can be disposed on the pipe rim, outside of the pipe, and the ball can be inserted into the pipe opening. As the ball travels through the pipe, the tube unfolds to cover the peripheral wall of the pipe. Thus, the tube of the device can cover an interior surface of the pipe.

12 Claims, 2 Drawing Sheets

DEVICE FOR REPAIRING DRAINAGE PIPES

BACKGROUND OF THE INVENTION

1. Field of the Invention

The present invention relates to fluid conduit protection, and particularly to a device for repairing drainage pipes.

2. Description of the Related Art

Most buildings include drainage pipes within the buildings walls. When a portion of a pipe becomes damaged, it is often necessary to break down one or more walls in order to repair the damaged pipe section. Removing and replacing the damaged pipe section can be an arduous task itself, however, the time and costs associated with breaking and repairing the dry wall around the damaged pipe can be more that of repairing the actual pipe section.

Thus, a device for repairing drainage pipes solving the aforementioned problems is desired.

SUMMARY OF THE INVENTION

A device for repairing drainage pipes includes a flexible tube with a first open end, a second open end, and a hollow interior extending between the first and second ends. A cover member is attached to the first end of the tube and a ball is releasably attached to the second end. The cover member has a central opening that is aligned with the hollow interior. The cover member can be disposed on the pipe rim, outside of the pipe. The tube of the device is configured to cover an interior surface of the drainage pipe upon insertion of the ball into the pipe opening. As the ball travels through the pipe, the tube unfolds to cover the peripheral wall of the pipe.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
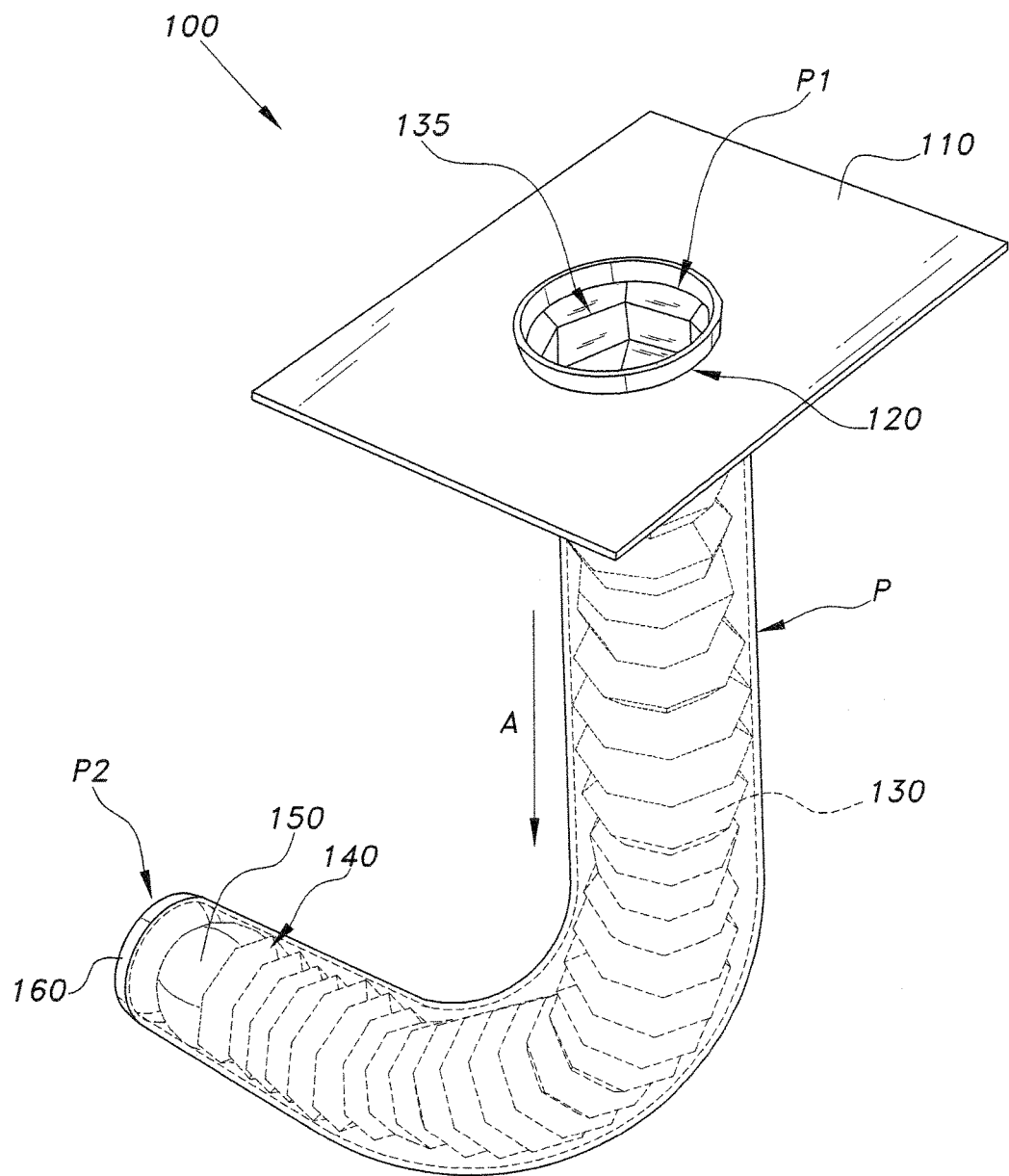
FIG. 1 is an environmental, perspective view of the device for repairing drainage pipes in an expanded state, according to the present invention.
Figure 2:
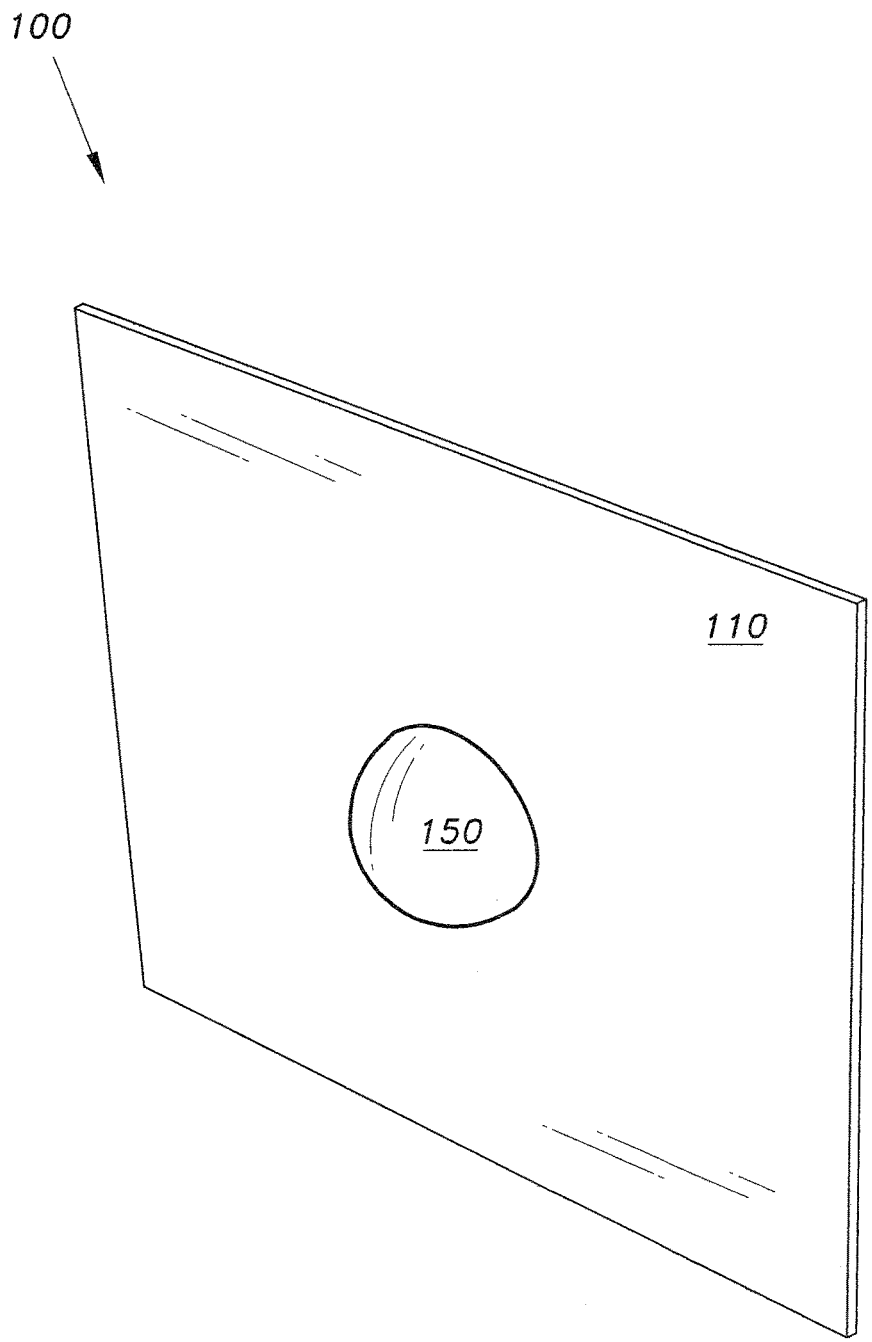
FIG. 2 is an environmental, perspective view of the device for repairing drainage pipes in a folded state, according to the present invention.

Referring to FIGS. 1 and 2, a device for repairing drainage pipes 100 is shown. The device 100 includes a flexible tube 130 with a first open end 135, a second open end 140, and a hollow interior extending between the first and second ends 135, 140. A cover member 110 is attached to the first open end 135 of the tube 130 and a ball 150 is releasably attached to the second open end 140. The cover member 110 has a central opening 120 that is aligned with the hollow interior. The tube 130 of the device 100 is configured for covering an interior surface of a drainage pipe P, commonly found inside the interior walls of buildings and on rooftops, as generally illustrated. Prior to use, the tube 130 can be in a folded state. In use, the cover member 110 can be positioned on the rim of the drainage pipe P, and the ball 150 can be inserted into a first end of the pipe P. As the ball 150 travels through the pipe, the attached tube 130 is pulled therewith to thereby cover an interior surface of the peripheral wall of the pipe P. When the ball 150 exits the pipe P from a second end of the pipe P, the ball can be detached from the second end of the tube 130. The second end of the tube 130 can be secured to an external surface of the pipe P. The remainder of the tube 130 remains within the pipe 130, covering the interior wall of the pipe P.

The flexible tube 130 can be formed from any suitable, lightweight, flexible material, e.g., a flexible, plastic material. Preferably, the tube 130 has a length and diameter that is less than or equal to the length and diameter of the pipe that is to be repaired. Prior to use, the tube 130 can be in a folded configuration, such as in a zig-zag fold, for compactness and easy storage, as illustrated in FIG. 2.

The cover member 110 can be formed from any suitable, rigid material, e.g., a rigid aluminum or plastic material. While the cover member 110 is preferably rectangular, the cover member 110 can have any shape and/or dimensions suitable for engaging the rim of the pipe and holding the first end of the tube 130 at the top of the pipe, P as illustrated in FIG. 1.

The ball 150 can be formed from any suitable material, such as a heavy rubber or metal material. The ball 150 preferably has a diameter smaller than the diameter of the drainage pipe P that is to be repaired.

Prior to use of the device 100, the flow of water through the drainage pipe P should be stopped. The cover 110 of the device 100 can then be positioned on top of the drainage pipe P so that the circular opening 120 is aligned with the top opening $P_1$ of the drainage pipe P. The ball 150, coupled to the end 140 of the flexible tube 130 can then be released into the top opening $P_1$ of the drainage pipe P. As the ball 150 rolls through the drainage pipe P, as illustrated by arrow A, the tube 130 simultaneously unfolds within the drainage pipe P. The ball 150 then exits through the bottom opening $P_2$ of the drainage pipe P. The ball 150 can then be detached from the end 140 of the flexible tube 130. The end 140 of the flexible tube 130 can be secured to the drainage pipe P. The remaining portion of the tube 130 remains stretched flush against the wall of the drainage pipe P to cover the leak in the drainage pipe P. The end 140 of the flexible tube 130 can be secured to the drainage pipe P using any suitable method or device, e.g., a drainage pipe cover 160. Once the device 100 has been deployed inside the drainage pipe P to cover the leak, the valve (not shown) can be reopened to allow fluid to flow through the drainage pipe P.

It is to be understood that the present invention is not limited to the embodiments described above, but encompasses any and all embodiments within the scope of the following claims.

I claim:

1. A device for repairing drainage pipes, comprising:
a flexible tube having a first open end, a second, opposing end, and a hollow interior extending between the first open end and the second open end;
a cover member disposed at the first open end of the tube, the cover member having a central opening aligned with the hollow interior, and
a ball releasably attached to the second open end of the tube;
wherein the ball moves through a drainage pipe under repair, resulting in the flexible tube being extended along the drainage pipe under repair;
whereby upon completion of extending the flexible tube within the drainage pipe under repair, the ball is released and continues along the path of the remainder of the drainage pipe under repair.

2. The device for repairing drainage pipes according to claim 1, wherein the cover member comprises a flat, rigid material.

3. The device for repairing drainage pipes according to claim 2, wherein the cover member is generally rectangular.

4. The device for repairing drainage pipes according to claim 1, wherein the tube includes a flexible, plastic material.

5. The device for repairing drainage pipes according to claim 1, wherein the ball includes at least one of a rubber material and a metal material.

6. The device for repairing drainage pipes according to claim 1, wherein the tube is foldable.

7. A method for repairing drainage pipes using the device of claim 1, comprising:
  positioning the cover member on the rim of the drainage pipe, wherein the opening of the cover member is aligned with the opening of the drainage pipe;
  releasing the ball into the drainage pipe; and
  securing the second end of the tube to the drainage pipe.

8. The method for repairing drainage pipes according to claim 7, wherein the cover member comprises a flat, rigid material.

9. The method for repairing drainage pipes according to claim 8, wherein the cover member is generally rectangular.

10. The method for repairing drainage pipes according to claim 7, wherein the tube includes a flexible, plastic material.

11. The method for repairing drainage pipes according to claim 7, wherein the ball includes at least one of a rubber material and a metal material.

12. The method for repairing drainage pipes according to claim 7, wherein the tube is foldable.

* * * * *